United States Patent [19]

Yamanoue et al.

[11] Patent Number: 4,631,736

[45] Date of Patent: Dec. 23, 1986

[54] PORTABLE TRANSMITTER WHICH CONSERVES TRANSMITTER POWER BY STORING CHARGES FROM PREVIOUS PULSES

[75] Inventors: Kouichi Yamanoue; Junji Kitagawa, both of Okazaki, Japan

[73] Assignee: Nippon Soken, Inc., Nishio, Japan

[21] Appl. No.: 638,649

[22] Filed: Aug. 7, 1984

[30] Foreign Application Priority Data

Sep. 8, 1983 [JP] Japan ................................ 58-165688

[51] Int. Cl.⁴ ................................................ H02M 3/17

[52] U.S. Cl. ........................................ 375/71; 307/44; 307/48; 307/66; 331/174; 455/127; 340/825.31

[58] Field of Search .................. 331/174; 455/127, 41; 307/296 A, 296 R, 44, 48, 64, 66; 375/70, 71; 340/696, 825.54, 825.31; 179/82

[56] References Cited

U.S. PATENT DOCUMENTS

| | | | |
|---|---|---|---|
| 324,621 | 8/1885 | Wheeler | 307/48 |
| 2,844,712 | 7/1958 | Noizeux | 375/71 |
| 3,176,229 | 3/1965 | Pierce | 375/71 |
| 3,980,996 | 9/1976 | Greenspan et al. | 455/127 |
| 4,093,877 | 6/1978 | Pollmeier | 307/296 A |

*Primary Examiner*—Robert L. Griffin
*Assistant Examiner*—Raymond C. Glenny
*Attorney, Agent, or Firm*—Cushman, Darby & Cushman

[57] ABSTRACT

A portable transmitter for transmitting a magnetic signal is disclosed. The transmitter is provided with a transmitting coil for generating a magnetic signal upon receiving an electric current from a dry cell through an intermittently operating electric current supplying transistor. The transmitter further comprises a capacitor, a charging line provided with a diode, and a switching transistor. The switching transistor makes the induced current which is generated in the transmitting coil, flow into the capacitor by way of the charging line when the electric current supply to the transmitting coil is stopped, and supplies the electric current stored by the capacitor to the transmitting coil when the electric current supply to the transmitting coil is started.

11 Claims, 6 Drawing Figures

PORTABLE TRANSMITTER WHICH CONSERVES TRANSMITTER POWER BY STORING CHARGES FROM PREVIOUS PULSES

BACKGROUND OF THE INVENTION

The present invention relates to a portable transmitter, particularly to a transmitter which transmits a magnetic signal.

The transmitter of this type transmits a pulse-shaped magnetic signal when the transmitting coil thereof is intermittently excited. The transmitter is employed in combination with a receiver for receiving the magnetic signal. The receiver is electrically connected to an operating mechanism such as an unlocking mechanism. By bringing the transmitter which generates a magnetic signal closer to the receiver, the above described operating mechanism can be automatically operated.

For example, when the above described transmitter approaches the unlocking mechanism for a trunklid of a vehicle, the unlocking mechanism is operated to open the trunklid automatically. Therefore, this transmitter is very convenient for a person carrying packages in both hands.

The transmitter of this type comprises an electric source such as a dry cell or a storage battery for operating the transmitting coil. Such an electric source is required to consume as litter electric current as possible in order to extend the working period thereof.

SUMMARY OF THE INVENTION

One object of the present invention is to provide a portable transmitter for transmitting a magnetic signal.

Another object of the present invention is to provide a portable transmitter in which the current consumption is small and the working period is long.

Still another object of the present invention is to provide a portable transmitter for transmitting a magnetic signal by which a locking device of a vehicle provided with a receiver is unlocked.

The portable transmitter of the present invention comprises an electric source, a transmitting coil for transmitting a magnetic signal upon receiving an electric current from the electric source, a switching means which is disposed between the electric source and the transmitting coil for intermittently supplying an electric current from the electric source to the transmitting coil and a storing means for storing an induced current generated in the transmitting coil when the electric current supply from the electric source to the transmitting coil is stopped and supplying the stored electric current to the transmitting coil when the electric current starts flowing from the electric source to the transmitting coil again.

The electric source, the transmitting coil, the switching means and the storing means are accomodated within a portable casing.

In the portable transmitter of the present invention, an electric current is supplied to the transmitting coil from the storing means in addition to that from the electric source, so that the electric current consumption of the electric source can be reduced and the working period thereof can be greatly extended.

BRIEF DESCRIPTION OF THE DRAWINGS

FIG. 1 is a frontview of the first embodiment in which the cover member $A_1$ is partially cut away;

FIG. 2 is a top plan view of the first embodiment;

FIG. 3 is a circuit diagram of the first embodiment;

FIG. 4 is a wave form chart of a transmitting signal;

DETAILED DESCRIPTION OF THE EMBODIMENTS

Hereinafter, the present invention will be explained in accordance with the embodiments.

Figure 1:
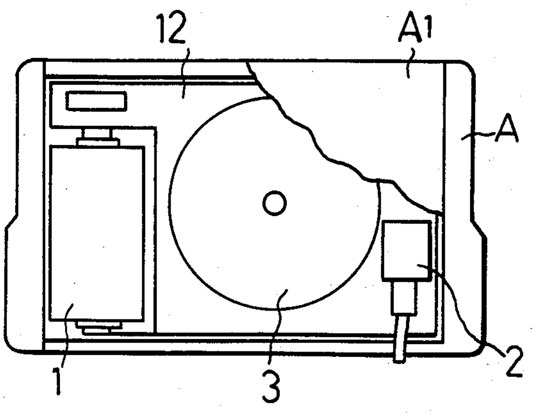
FIGS. 1 to 4 illustrate a first embodiment of the portable transmitter according to the present invention.
Figure 2:
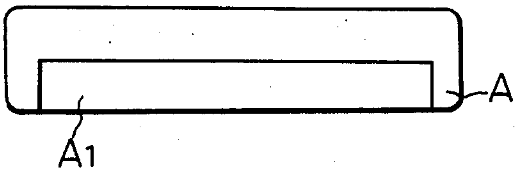

FIG. 1 is a front view of a first embodiment of the transmitter according to the present invention, in which a cover $A_1$ is partially cut away, and FIG. 2 is a top plan view of the first embodiment. In FIGS. 1, 2, a rectangular shallow casing A is covered with the detachable cover $A_1$. A dry cell 1, an electric source switch 2, a transmitting coil 3 and a printed circuit board 12, on which an electric circuit is formed, are accommodated within the casing A.

Figure 3:
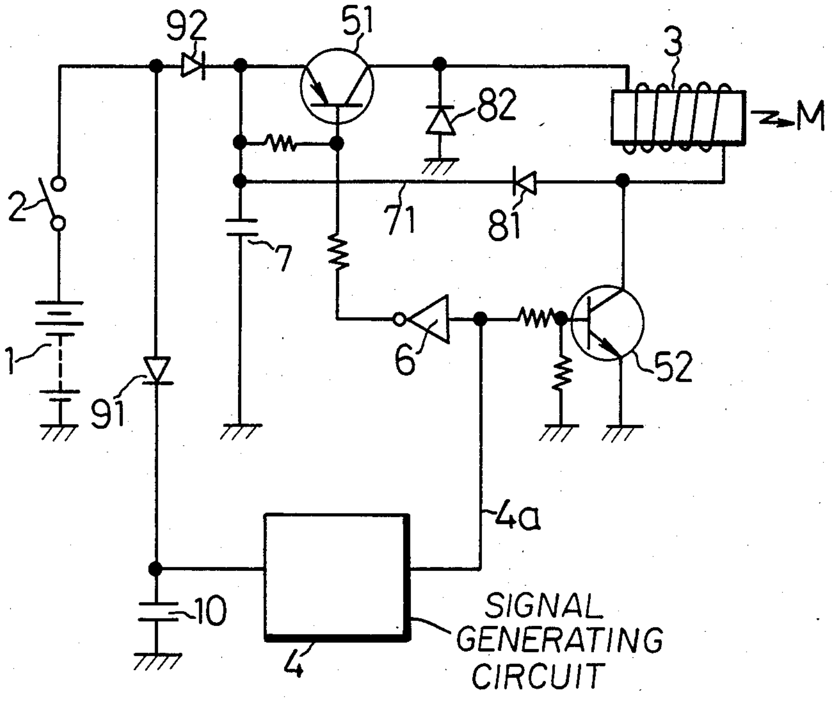

FIG. 3 is a circuit diagram of the first embodiment of the transmitter according to the present invention.

In FIG. 3, one end of the transmitting coil 3 is connected to the dry cell 1 through a transistor 51 which acts as a switching contact of a switching means while the other end thereof is grounded through a transistor 52 which acts as an electric current supplying contact of a switching means. An output terminal of a transmitting signal generating circuit 4 is connected to the base of the transistor 52 and is also connected to the base of the transistor 51 through an inverter 6. A capacitor 7 which acts as a storing means, is disposed between the emitter of the transistor 51 and ground. The capacitor 7 is connected to the other end of the transmitting coil 3 by way of a charging line 71 provided with a diode 81. The anode of the diode 81 is positioned on the side of the coil 3. A diode 82 is disposed between one end of the transmitting coil 3 and ground so that the anode is grounded. The reference numerals 91, 92 designate protecting diodes and 10 designates a smoothing capacitor.

Figure 4:
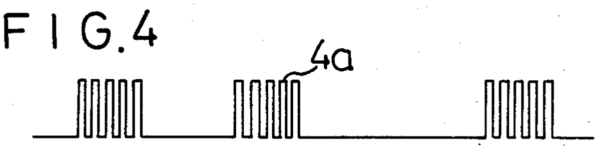

The transmitting signal generating circuit 4 outputs a transmitting signal 4*a* composed of high frequency pulse trains which are generated at predetermined intervals as shown in FIG. 4.

When the transmitting signal 4*a* is high level, the transistors 51, 52 conduct to excite the transmitting coil 3. Then, the coil 3 generates a magnetic signal M.

When the transmitting signal 4*a* is low level, the transistors 51, 52 are cut off so as to stop an electric current flow to the transmitting coil 3. However, at this time, an induced current having the same current intensity as that of the electric current which flowed before the transistors 51, 52 are cut off, flows through the coil 3 due to the self-induction thereof for a while. This induced current flows through the diode 81, the capacitor 7 and the diode 82. As a result, the capacitor 7 stores electric charge of the same polarity as that of the dry cell 1.

The stored electric charge is supplied to the coil 3 when the transmitting signal 4*a* is high level to make the transistors 51, 52 conduct.

At this time, an electric current is also supplied from the dry cell 1 to the transmitting coil 3. Since the dry cell 1 is required to supply only an electric current corresponding to the difference between the electric current required for exciting the coil 3 and that supplied by the capacitor 7, the electric current consumption of the dry cell 1 becomes very small.

Figure 6:
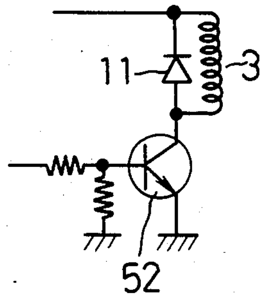
FIG.6 PRIOR ART
FIG. 6 is a circuit diagram of the transmitting coil of a conventional transmitter.

As a result of the inventors' experiments, it has been proved that the transmitter of the present invention can reduce the current consumption of the dry cell 1 to about 1/10$^{th}$ as compared with the conventional transmitter wherein the induced current generated in the coil 3 is made to disappear by connecting the diode 11 to the transmitting coil 3 in parallel as shown in FIG. 6. Consequently, the working period of the transmitter of the present invention can be much greatly extended.

It is preferable to increase the capacity of the capacitor 7 to such an extent as not to deform the wave shape of the magnetic signal M of high frequency.

Figure 5:
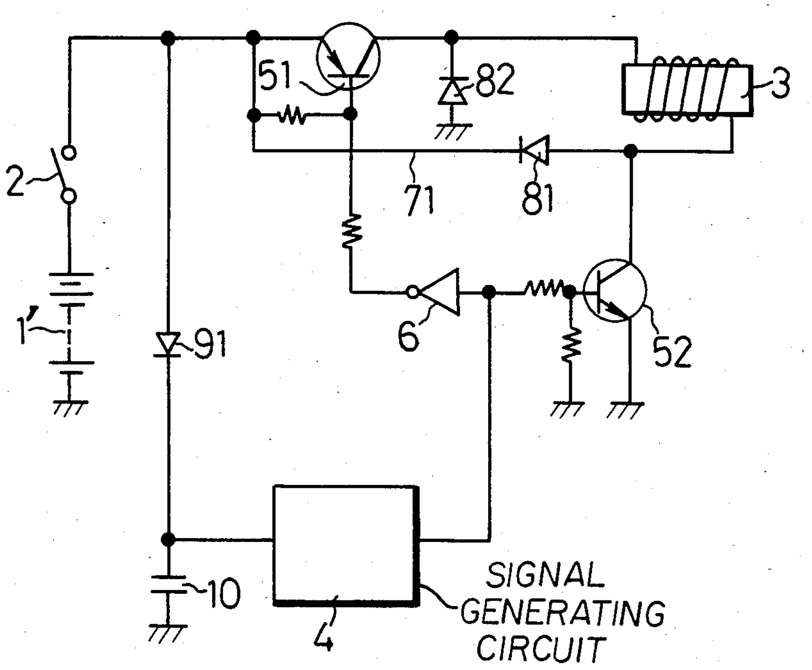
FIG. 5 is a circuit diagram of a second embodiment of the transmitter according to the present invention.

FIG. 5 is a circuit diagram of a second embodiment of the transmitter of the present invention. In the second embodiment, a storage battery 1' is employed in place of the dry cell 1.

According to the second embodiment, the induced current generated in the coil 3 is directly returned to the storage battery 1' so that such a condensor 7, as is used in the first embodiment, is unnecessary.

The second embodiment achieves the same effect as that of the first embodiment.

As described above, the portable transmitter of the present invention comprises a storing means for storing the induced current generated in the transmitting coil when an electric current supply from an electric source is stopped. When the transmitting coil starts to generate a magnetic signal again, an electric current is supplied to the coil from the storing means in addition to the electric source. Therefore, the electric current consumption of the electric source can be reduced so that the working period of the transmitter can be greatly extended.

What is claimed is:

1. A portable transmitter comprising:
- a casing;
- an electric source provided within said casing;
- a transmitting coil provided within said casing;
- switching means provided between said electric source and said transmitting coil for intermittently supplying electric current to said transmitting coil to generate a magnetic signal;
- storing means for storing an electric charge generated in said transmitting coil when an electric current supply from said electric source to said transmitting coil is stopped, and supplying the stored electric current to said transmitting coil when an electric current supply from said electric source to said transmitting coil is started again, said storing means including (a) a storage device for storing said electric charge, and (b) a charging line which allows an induced current to flow into said storage device,
- wherein said switching means includes a switching contact for connecting said storage device to said transmitting coil through said charging line when the electric current supply to said transmitting coil is stopped and connecting said storage device to said transmitting coil directly without passing through said charging line when the electric current supply to said transmitting coil is started.

2. A portable transmitter according to claim 1 wherein said charging line includes a diode.

3. A portable transmitter according to claim 1, wherein said switching means further includes a transmitting signal generating circuit for generating a transmitting signal composed of a plurality of pulse trains which are generated at predetermined intervals, and an electric current supplying contact which is intermittently operated by the transmitting signal generated by said transmitting signal generating circuit.

4. A portable transmitter according to claim 1, wherein said storage device is a capacitor and said electric source is a dry cell.

5. A portable transmitter according to claim 1, wherein said storage device is a storage battery which also acts as said electric source.

6. A portable transmitter, comprising:
- a switch adapted to be coupled to a source of electric current;
- transmitting means for transmitting a signal, said transmitting means having first and second ends;
- first switching means, coupled between said switch and said transmitting means first end, for selectively providing electric current to said transmitting means;
- second switching means, coupled between said transitting means second end and ground, for selectively causing said electric current to flow through said transmitting means;
- storing means, coupled between ground and said transmitting means second end, for storing an electric charge induced by said transmitting means when said first switching means is not providing electric current to said transmitting means.

7. A transmitter according to claim 6 further including signal generating means for controlling said first and second switching means.

8. A transmitter according to claim 7 wherein said signal generating means provides a signal comprising a plurality of pulse trains which are generated at predetermined intervals.

9. A transmitter according to claim 6 further including a charging line coupled between said transmitting means second end and said storing means.

10. A transmitter according to claim 9 wherein said charging line includes a diode.

11. A transmitter according to claim 6 further including electric current source means, coupled to said switch, for providing said electric current to said switch.

* * * * *